United States Patent Office 2,937,144
Patented May 17, 1960

2,937,144

HEAVY DUTY GEAR LUBRICANT

Arnold J. Morway, Clark, N.J., and Earl W. Ball, New Rochelle, N.Y., assignors to Esso Research and Engineering Company, a corporation of Delaware No Drawing. Application February 20, 1956
Serial No. 566,382

5 Claims. (Cl. 252—33.3)

The present invention relates to a heavy duty gear lubricant and more generally to a heavy duty lubricant composition which is suitable for use on open gears and in gear boxes and the like where large gears are subjected to relatively heavy loads over extended periods. A particular application of the lubricant composition of this invention is the lubrication of traction gears and gear boxes on diesel locomotives and the like but it will be understood that the composition is slightly useful on open gears and may be used for various analogous or related purposes.

This application is a continuation-in-part of Serial No. 325,690, filed December 12, 1952 and now abandoned.

In the prior art various lubricants have been used in diesel-electric traction gear service prepared from asphaltic residuum diluted to the proper viscosity with suitable lubricating oils or mineral oil distillates. Under favorable conditions these lubricants have given excellent lubrication. Sometimes where operating pressures are heavy, as in some open gear mechanisms, extreme pressure additives such as oil soluble lead soaps and/or sulfurized fatty oils or other materials have been incorporated in prior art compositions.

The prior art materials described above have generally been satisfactory for the lubrication of enclosed traction gears under conditions where there is no leakage and where the gear boxes are fluid tight. Unfortunately it is extremely difficult to maintain gear boxes that are completely fluid tight and leakage of the lubricant frequently results. This leakage, resulting from poorly fitting cases or cases which have been strained or bent or otherwise distorted, is an operational hazard. There is also the possibility in many cases of some object puncturing the gear case on a diesel electric locomotive and when this occurs the resulting loss of lubricant results in rapid gear failure, possible gear seizure and even train wreckage. The expense of maintenance of such gear boxes is considerable due to leakage. Operating temperatures on railroads vary widely. In cold weather, for example at 0° F. or lower, these asphaltic type lubricants of the prior art give very poor lubrication. At elevated temperatures of 150° F. or higher, which are not uncommon, the lubricants become so thin that they are rapidly lost by leakage.

In order to overcome leakage of the type just described a shear resistant soap thickened lubricant as taught by the prior art, was prepared, comprising a soda soap and a lead soap in a suitable liquid containing asphaltic residuum and non-asphaltic oil. This lubricant was satisfactory as regards leakage, after 15,000 miles operation in a diesel electric locomotive, even in a poorly fitted gear case. However, it was found to oxidize rather severely after a short time with a resultant increase in viscosity. After some length of time this asphaltic lubricant became so viscous that it was no longer satisfactory or efficient as a gear lubricant.

According to the present invention is has been discovered that it is more satisfactory for long service to use a non-asphaltic resin ingredient in the oil in lieu of the asphaltic constituent described in tne aforesaid patent. When this is done it is found also that it is not necessary to use a lead soap to obtain a reasonably satisfactory lubricant even under severe unit load or extreme pressure operation.

In preparing a suitable locomotive gear lubricant, it has also been found essential to thicken the non-asphaltic resin ingredient with a soap salt complex thickener. Other thickeners have not been found satisfactory. For example, a lubricant was prepared from a propane extracted resin thickened with N-stearoyl-p-amino phenol. This lubricant, after extended use in a locomotive, was found to fluidize and leaked from the gear case. Another lubricant was also prepared using a simple soap as the thickener for the non-asphaltic resin ingredient. This lubricant was prepared using 9.0 wt. percent of a sodium soap of tallow fatty acids and 91.0% of a propane extracted resin from a Pennsylvania oil. The resulting grease had an unworked penetration at 77° F. of 295; when worked 60 strokes the grease had a penetration of 330. However, this grease fluidized sufficiently in laboratory shear tests to show that it was unsuitable and it was not therefore tested in actual gear service.

According to the present invention an excellent non-leaking lubricant for heavy duty gears and the like is prepared which does not oxidize over long periods and which does not harden unduly in use and does not become too fluid on being subjected to severe shearing stresses. The improved lubricant utilizes an alkali metal soap-salt complex thickener, usually a sodium complex. Suitable soap-salt complexes consist of a major proportion of the alkali metal soap of higher fatty acids, of the $C_{16}$ to $C_{22}$ range, preferably saturated for stability, and a minor proportion of low molecular weight alkali metal salts, of organic acids containing less than 6 carbon atoms, such as sodium acrylate. A very satisfactory thickener is the soap prepared from rapeseed oil when cooked at high temperatures. Rapeseed oil is slowly heated with an excess of alkali in a lubricating oil to a temperature of about 350 to 380° F. where saponification takes place. The amount of alkali used is about 75 to 125% in excess, preferably about twice that required to saponify the rapeseed oil. The temperature of the reaction mixture is then raised to at least about 425° F. at which temperature hydrogen gas evolution begins. The mixture is then heated to and maintained at a temperature of about 450° to 500° F. for about 1 to 4 hours, preferably for about 2 hours. Preferably, the final temperature is about 500° F. During this heating step the rapeseed oil soap breaks down to some extent to liberate glycerin. The glycerin in turn breaks down to produce acrolein which is converted into the alkali metal salt of a low molecular weight acid by alkali fusion. Thus the final product comprises a mixture of $C_{16}$ to $C_{22}$ fatty acid soaps with sodium acrylate in minor proportions, up to about 1 mole of sodium acrylate per mole of high molecular weight acid. Some sodium formate, sodium acetate, sodium propionate and the like might also be present.

In preparing lubricants according to the present invention, the complex soap thickener is prepared in part of the mineral oil to form a concentrate. This base grease concentrate is then preferably shear hardened to its ultimate hardness by passage through a homogenizer where it is subjected to a very high rate of shear. This pre-hardening step is preferred, as it is particularly desirable to prevent undue hardening of the lubricant in the lubrication of heavy duty gears, such as in locomotive service, where severe shearing stresses are developed. A standard Gaulin homogenizer operating at 3000 to 5000 p.s.i. is highly satisfactory for this purpose but other apparatus such as a Morehouse mill giving equivalent high rates of shear may be utilized. Alternatively, or in addition, the shear hardening or homogenization at high shear rates may be carried out at a later stage, after the grease base is cut back as next described.

The base grease (soap concentrate), stabilized against further hardening under severe shear conditions by the above treatment, is next combined with a propane precipitated resinous fraction having a high non-asphaltic resin content derived from a mineral oil residuum and which is not susceptible to excessive increase in viscosity due to oxidation. The propane precipitation treatment is well known in the art and is described in detail in U.S. Patents 2,143,872 and 2,143,882, and in Ind. and Eng. Chem., vol. 32, No. 3, pages 294–298, March 1940. This blending is carried out at temperatures not in excess of 200° F. and preferably below 200° F. The lubricant after blending is preferably subjected to a second homogenization or milling action. This second homogenization step gives complete homogeneity to the lubricant. It is very important in heavy duty use that the grease be completely homogeneous, as lack of homogeneity can result in gear tooth damage if only the lighter portion of the lubricant came in contact with the gears under extreme pressures.

The resinous material is obtained by propane precipitation of either Mid-Continent or Pennsylvania crude oil provided it contains a substantial proportion of the resinous constituent.

A preferred composition, therefore, contains about 5 to 20 parts by weight of a soda soap-salt complex as defined above, compounded with 10 to 30 parts by weight of a relatively light mineral base lubricating oil of about 40 to 90 S.S.U. viscosity at 210° F. and about 65 to 82 parts by weight of the more viscous and predominantly non-asphaltic oil with a high resin content. This viscous, high resinous-content constituent should have a viscosity of about 5,000 to 15,000 S.S.U. at 210° F., and preferably about 12,000 to 15,000 S.S.U. at 210° F. The higher viscosity of 12,000 to 15,000 is preferred to prevent metal to metal contact when the final grease composition is used in lubricating locomotive traction gears.

To inhibit oxidation of the oil it is desirable to add a small amount, such as 0.1 to 2.0% by weight, based on the total composition, of an oxidation inhibitor. The latter may be any conventional inhibitor such as N-stearoyl or lauroyl para-amino phenol, phenyl alpha-naphthylamine, etc. A small amount, such as 0.1 to 2.0 by weight based on the total composition, of oil soluble alkali metal or alkaline earth metal salts of sulfonic acids having molecular weights of about 350 to 450 may also be incorporated. The latter is an effective rust inhibitor in small proportions. Between 0.1 to 1.0% of a metal deactivator, such as: the sodium salt of ethylene diamine tetraacetic acid, the condensation product of 1 mole of either propylene diamine or ethylene diamine and 2 moles of salicylaldehyde, and others, may also be added for the purpose of chelating any copper or metal that may contaminate the lubricant, thereby inhibiting the pro-oxidation properties of such metal contaminant. The invention will be more clearly understood by reference to the following specific example.

EXAMPLE I

| Formulation | Wt. Percent |
|---|---|
| Rapeseed Oil | 8.00 ⎫ 9.44% complex |
| Sodium Hydroxide | 1.44 ⎭ thickener. |
| Sodium Sulfonate | .25. |
| Phenyl alpha-Naphthylamine | .25. |
| Metal Deactivator (Condensation product of 1 mole propylene diamine and 2 moles of salicylaldehyde). | 0.13. |
| Low Cold Test Mineral Oil having 55 S.S.U. vis. at 210° F. | 14.93. |
| Non-asphaltic resin (Propane precipitated resin extracted from Pennsylvania oil) 14,000 S.S.U. vis. at 210° F. | 75.00. |

*Preparation.*—The composition recited above was prepared by charging the rapeseed oil, sodium sulfonate and 55% of the low cold test mineral oil to a grease kettle. The mixture was heated to 150° F. and then a 40% aqueous solution of sodium hydroxide was added. The temperature of the mass was raised over a 4 hour period to about 350° F. where the soap was dried out. Heating was continued for another 2 hours until the temperature reached 500° F. During this time the glycerine formed by saponification of the rapeseed oil had dehydrated to acrolein and fused to sodium acrylate. The remainder of the low cold test mineral oil was added and the mixture cooled to about 250° F. over a 5 hour period. At 250° F. oxidation inhibitors were added (.25% phenyl alpha naphthylamine and 0.13% of the condensation product of 1 mole of propylene diamine and 2 moles of salicylaldehyde) and the grease was further cooled to 200° F. At this temperature the grease was stabilized against shear hardening by passage through a Gaulin homogenizer operating at 5,000 p.s.i. (If preferred, the grease may be blended with the non-asphaltic resin prior to homogenization and the blended grease finished by Gaulin homogenization.) The homogenized grease was then blended with the non-asphaltic resin and packaged.

The above product had a penetration value of 310 mm./10 unworked, a penetration of 320 after 60 strokes in the standard ASTM grease worker, and a dropping point of 400° F. and a viscosity of 3,000 S.S.U. at 210° F.

The following table shows the superiority of the grease of Example I as compared to similar resinous base greases of like initial consistency but which utilize a different thickener.

As seen from the table below only the grease prepared with the soap-salt complex from rapeseed oil retained its consistency and did not fluidize even after a year of locomotive service. The greases formed with N-stearoyl-p-amino phenol and the simple soap thickener (sodium tallowate) broke down and fluidized after use. These results demonstrate the importance of using a complex thickener in preparing a suitable grease.

A specifically preferred composition consists of about 5 to 12 parts by weight of soda soap of rapeseed oil which has been heated sufficiently, as described above to form a soap-salt complex thickener. This is blended into and heated with 11 to 25 parts by weight of low cold test mineral oil to about 45 to 60 S.S.U. viscosity at 210° F., preferably about 55 S.S.U. After this soap concentrate is prepared the additional ingredients may be blended in consisting of about 70 to 80 parts by weight of a propane precipitated resin such as that derived from Pennsylvania or from Panhandle stock. To this may be added about 0.1 to 2%, preferably about 0.2% of the sulfonate and conventional quantities, 0.1 up to 2%, usually around 0.5 to 1.5% of appropriate anti-oxidants. Here again where extreme pressure additives are deemed desirable a sulfurized fatty oil such as sulfurized sperm oil or sulfurized lard oil may be added, preferred proportions being 5 to 10%, although lesser quantities may be sufficient. It will be understood that other ingredients, such as tackiness and stringiness agents, may be used along with conventional modifiers such as pour point depressants, metal deactivators, and the like, in the usual quantities and proportions. While soda soaps are preferred in preparing the complex soap-salt thickeners, because of their high temperature stability, soaps of other metals may be used in some cases to replace at least part of the soda soap content and soaps of substituted acids may be used in lieu of part of the straight fatty acid soaps, such as sodium soaps of 12-hydroxy stearic acid, keto-stearic acids, sulfur bearing long chain fatty acids, and the like.

Traction motor gear lubricants

| Examples | Penetration, 77° F. | | | Locomotive Gear Test |
|---|---|---|---|---|
| | Unworked | Worked | | |
| | | 60 | 100,000 | |
| A. 1.0% N-stearoyl-p-amino phenol, 99.0% Propane extracted resin from Penn. Oil 3000 S.S.U. at 210° F. | 300 | 310 | 340 (77° F.) / 345 (120° F.) | Fluidized and leaked from case.[1] |
| B. 9.0% Sodium Tallowate, 91.0% Propane extracted resin from Penn. Oil, 3000 S.S.U. at 210° F. | 295 | 330 | 340 (77° F.) / 375 (130° F.) | Fluidized and leaked from case.[2] |
| C. Grease Of Example I | 310 | 320 | 330 (77° F.) / 340 (125° F.) | Retained consistency and did not leak from case after one year locomotive service.[3] |

[1] The traction motor driving gear case of a diesel locomotive manufactured by the American Locomotive Company was filled with the grease of Example A. This locomotive ran for three months in relatively light duty service between New Haven and New York city. Inspection of the gears and lubricant showed slight wear on pinions and gear teeth with little or no lubricant remaining in the case.

[2] This grease was tested in a laboratory simulated gear test. The test equipment consisted of a small gear operating with external heating at 150° F. under a slight load. The gear case surrounding the gear was not tight fitting. After 24 hours service, the grease of Example B had fluidized and had completely leaked from the case. The grease of Example A in a similar 24 hour test showed 25% leakage, while the grease of Example C in the same test was retained in the case.

[3] The grease of Example C was tested in the traction motor driving gear case of a locomotive manufactured by the Electromotive Division of General Motors. This locomotive served on the Western Maryland Railroad in heavy duty freight service. After approximately 1 year service an inspection showed only slight wear of the pinion and driving gear teeth with no noticeable leakage of lubricant from the gear cases. Retention was excellent and only a minimum amount of lubricant make-up was required.

What is claimed is:

1. A viscous, non-liquid lubricating composition for heavy gears comprising about 5 to 20 parts by weight, based on the total composition, of a dehydrated soap-salt complex of soda soap of high molecular weight fatty acid and low molecular weight soda salt, about 10 to 30 parts by weight of a light mineral base lubricating oil of about 40 to 90 SSU viscosity at 210° F., and about 65 to 82 parts by weight of a viscous, non-asphaltic resinous oil of about 12,000 to 15,000 SUS viscosity at 210° F.

2. A viscous, non-liquid lubricating composition for heavy gears comprising about 5 to 12 parts by weight, based on the total composition, of a dehydrated soap-salt complex obtained from a soda soap of rapeseed oil when heated at high temperatures, about 11 to 25 parts of a light mineral base lubricating oil of about 40 to 90 SSU viscosity at 210° F., and about 70 to 80 parts by weight of a viscous non-asphaltic resinous oil of about 12,000 to 15,000 SSU viscosity at 210° F.

3. A grease composition according to claim 2, wherein said grease has been stabilized against shear hardening.

4. A grease composition according to claim 2, which contains in addition, about 0.1 to 2.0 wt. percent of an oxidation inhibitor, about 0.1 to 2.0 wt. percent of an oil soluble petroleum sulfonate, and about 0.1 to 1.0 wt. percent of a metal deactivator.

5. A substantially solid heavy duty lubricant composition having approximately the following composition by weight:

9.44% of a soap-salt complex thickener obtained from soda soap of rapeseed oil, heated sufficiently to form a complex, 15% low cold test mineral oil of about 45–60 SSU viscosity at 210° F., 75% of non-asphaltic propane precipitated resin of about 12,000 to 15,000 SUS viscosity at 210° F., 0.25% oil soluble sodium petroleum sulfonate, 0.1% condensation product of 1 mole of propylene diamine and 2 moles of salicylaldehyde.

References Cited in the file of this patent
UNITED STATES PATENTS

| | | |
|---|---|---|
| 2,245,772 | Gothard et al. | June 17, 1941 |
| 2,265,791 | Zimmer et al. | Dec. 9, 1941 |
| 2,378,818 | Zimer et al. | June 19, 1945 |
| 2,468,099 | Morway | Apr. 26, 1949 |
| 2,477,311 | Morway | July 26, 1949 |
| 2,629,666 | Morway et al. | Feb. 24, 1953 |